United States Patent
Engstrom et al.

(10) Patent No.: US 7,212,839 B2
(45) Date of Patent: *May 1, 2007

(54) VISUALIZATION SUPPLEMENTED WIRELESS MOBILE TELEPHONY-AUDIO

(75) Inventors: G. Eric Engstrom, Kirkland, WA (US); Tyrol R. Graham, Seattle, WA (US)

(73) Assignee: Wildseed Limited, Seattle, WA (US)

( * ) Notice: Subject to any disclaimer, the term of this patent is extended or adjusted under 35 U.S.C. 154(b) by 650 days.

This patent is subject to a terminal disclaimer.

(21) Appl. No.: 10/686,958

(22) Filed: Oct. 15, 2003

(65) Prior Publication Data

US 2004/0137954 A1    Jul. 15, 2004

Related U.S. Application Data

(63) Continuation-in-part of application No. 10/086,954, filed on Mar. 1, 2002, now Pat. No. 6,944,482, and a continuation-in-part of application No. 10/087,098, filed on Mar. 1, 2002, now abandoned, and a continuation-in-part of application No. 09/908,118, filed on Jul. 17, 2001, now Pat. No. 7,072,621, and a continuation-in-part of application No. 09/767,587, filed on Jan. 22, 2001, now Pat. No. 6,418,323, and a continuation-in-part of application No. 09/767,197, filed on Jan. 22, 2001, now Pat. No. 6,952,597.

(60) Provisional application No. 60/418,765, filed on Oct. 15, 2002, provisional application No. 60/313,247, filed on Aug. 17, 2001, provisional application No. 60/306,326, filed on Jul. 17, 2001.

(51) Int. Cl.
*H04B 1/38* (2006.01)
*H04M 1/00* (2006.01)

(52) U.S. Cl. .................. 455/566; 455/567; 455/550.1; 455/90.3; 455/418; 455/414.1; 340/7.6; 340/7.61; 340/815.45; 345/31; 345/169; 345/173

(58) Field of Classification Search ................ 455/566, 455/567, 550.1, 557, 418, 556.1, 411, 404.1, 455/410, 406, 415, 90.3, 414.1; 345/169, 345/173

See application file for complete search history.

(56) References Cited

U.S. PATENT DOCUMENTS

| 5,946,636 | A | * | 8/1999 | Uyeno et al. ............... 455/566 |
| 5,973,612 | A | | 10/1999 | Deo et al. |
| 6,144,848 | A | | 11/2000 | Walsh et al. |

(Continued)

*Primary Examiner*—Marceau Milord
(74) *Attorney, Agent, or Firm*—Schwabe, Williamson & Wyatt, P.C.

(57) ABSTRACT

A wireless mobile phone is provided with the capability to visually convey audio to users, using a number of light sources, such as light emitting diodes (LEDs), in accordance with one or more attributes of the audio. The attributes may include different volume, spectrum, treble, bass, and so forth. The visualization may animate dance steps. In various embodiments, the implementations may include a visualization controller to selectively activate and deactivate the LEDs. The LEDs may be disposed on a side surface or underneath an array of input keys. In various embodiments, all or selected combinations of the elements may be part of the base unit of the wireless mobile phone, while the remaining elements, if any, may be part of an interchangeable cover. The cover may be a housing cover or an accessory cover.

36 Claims, 8 Drawing Sheets

U.S. PATENT DOCUMENTS

| | | |
|---|---|---|
| 6,304,763 B1 | 10/2001 | Jahagirdar et al. |
| 6,418,323 B1 * | 7/2002 | Bright et al. ............. 455/550.1 |
| 6,438,390 B1 | 8/2002 | Awan et al. |
| 6,574,388 B2 * | 6/2003 | Laor ........................... 385/18 |
| 6,792,294 B1 * | 9/2004 | Kushita ...................... 455/566 |
| 6,856,816 B2 * | 2/2005 | Porter ........................ 455/564 |
| 6,922,258 B2 * | 7/2005 | Pineau ...................... 358/1.15 |
| 6,944,482 B2 * | 9/2005 | Engstrom et al. ........... 455/566 |
| 6,952,597 B2 * | 10/2005 | Graham et al. ............. 455/566 |
| 7,010,288 B2 * | 3/2006 | Brown et al. ............. 455/412.1 |
| 7,072,621 B1 * | 7/2006 | Engstrom et al. .......... 455/90.1 |

\* cited by examiner

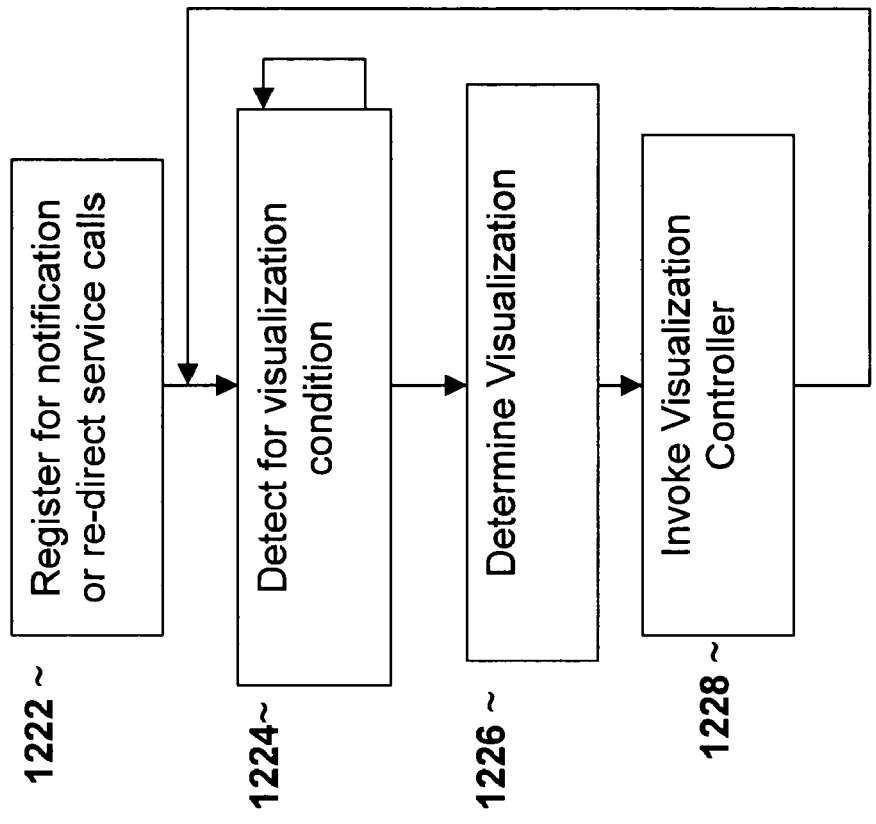
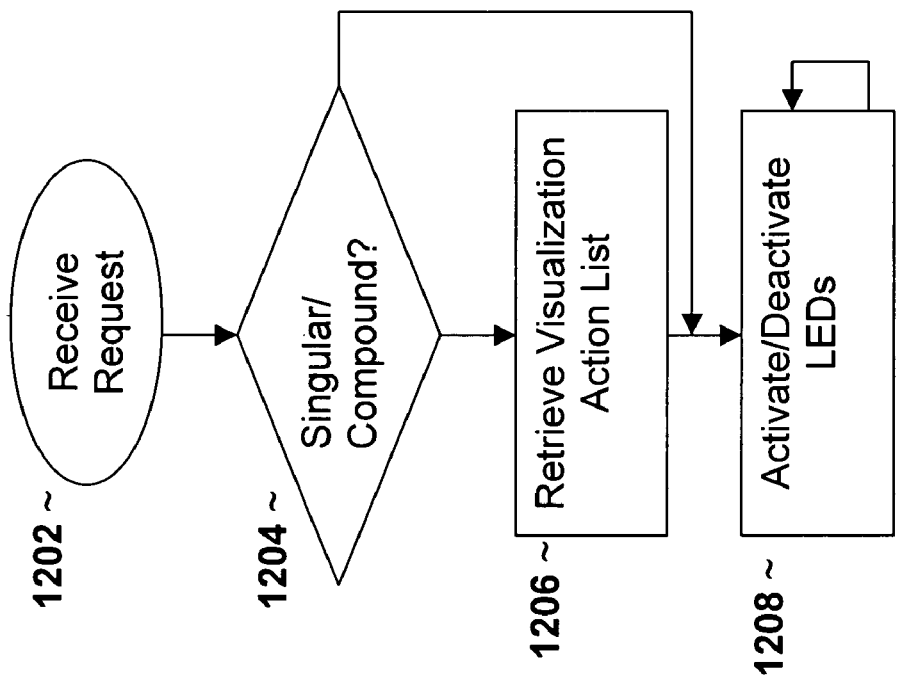
Figure 2b
Figure 2a

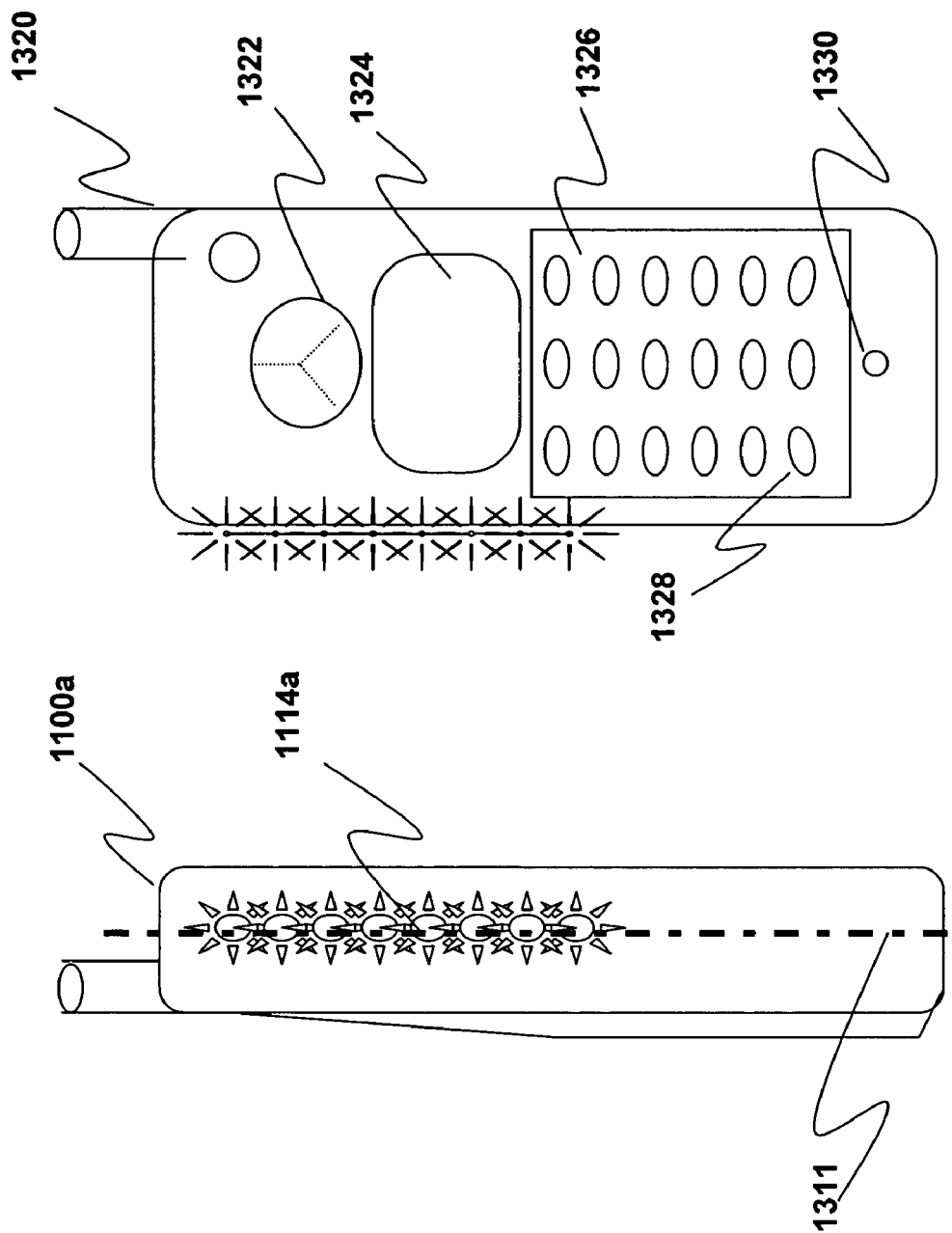

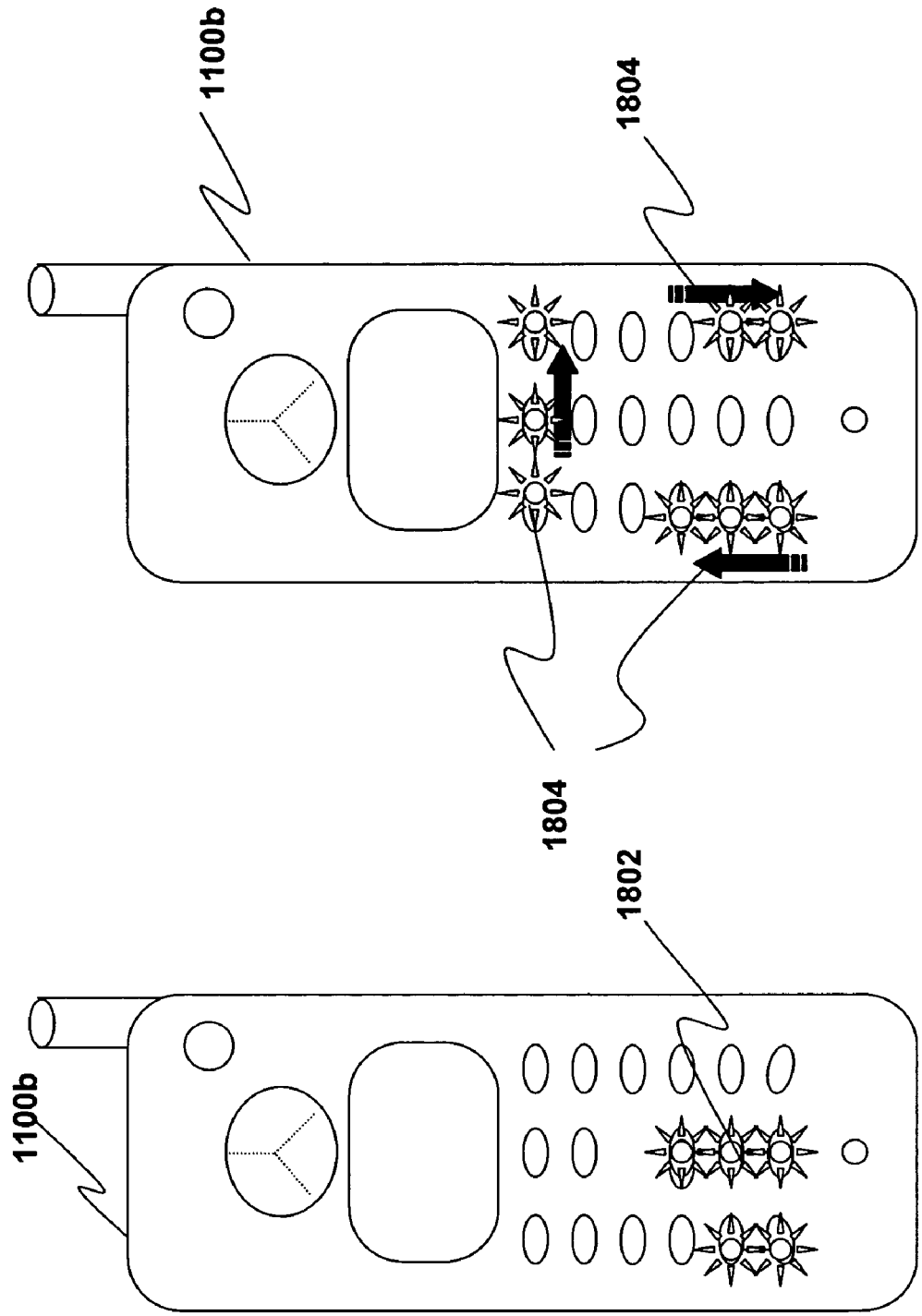

VISUALIZATION SUPPLEMENTED WIRELESS MOBILE TELEPHONY-AUDIO

RELATED APPLICATIONS

The present application is a non-provisional application of provisional application No. 60/418,765, filed Oct. 15, 2002, having the same title.

The present application is also a continuation-in-part application of
- (a) U.S. patent application Ser. No. 10/086,954, filed Mar. 1, 2002 now U.S. Pat. No. 6,944,482, entitled "Visualization Supplemented Wireless Mobile Telephony", which claims priority to provisional application 60/313,247, filed Aug. 17, 2001. The '954 application is a continuation-in-part application of U.S. patent application Ser. No. 09/767,587, filed Jan. 22, 2001 now U.S. Pat. No. 6,418,323, entitled "A Wireless Mobile Phone with Morse Code and Related Capabilities";
- (b) U.S. patent application Ser. No. 09/767,197, filed Jan. 22, 2001 now U.S. Pat. No. 6,952,597, entitled "A Wireless Mobile Phone with Key Stroking Based Input Facilities";
- (c) U.S. patent application Ser. No. 10/087,098, filed Mar. 1, 2002 now abandoned, entitled "Method and Apparatus For Personalizing Mobile Electronic Devices Including Interchangeable Coverings with Embedded Personality" (which itself is a non-provisional application of provisional application No. 60/306,326, filed on Jul. 17, 2001, with the same title); and
- (d) U.S. patent application Ser. No. 09/908,118, filed Jul. 17, 2001 now U.S. Pat. No. 7,072,621, entitled "Method and Apparatus For Facilitating Luminescent Displays Utilizing A Wireless Mobile Phone".

The specifications of these applications are herein fully incorporated by reference.

FIELD OF PRESENT INVENTION

The present invention relates to the field of wireless mobile telephony. More specifically, the present invention relates to visualization of various non-visual aspects of wireless mobile telephony to further improve the usability of wireless mobile phones.

BACKGROUND OF THE PRESENT INVENTION

Advances in integrated circuit and telecommunication technology have led to wide spread adoption of wireless mobile client devices, in particular, wireless mobile phones. Wireless mobile phones are popular, partly because they offer the advantage of enabling their users to be communicatively reachable by their business associates, friends and family members, wherever the users may be, as long as they are within the reach of the service networks.

Ever since their initial introductions, the cost for owning and using a wireless mobile phone has steadily declined. Today, the cost for owning and using a wireless mobile phone is well within the ability of many non-professionals. In fact, as the cost for air time continues to decline, wireless mobile phones have become the first medium of communication for non-professionals as well as professionals. When the need to make a call arises, a wireless mobile phone user will reach for their wireless mobile phone first, even if a traditional wired line telephone is readily available.

At the same time, successive generations of wireless mobile phones have also packed more functions and performance while reducing in size. Today, virtually all wireless mobile phones offer core functions such as dial list, call log, and so forth, while many high end models offer advanced functions such as emails and Internet access.

However, there remains a number of situations where the current generation of wireless mobile phones do not adequately address the users' needs and further improvements are needed. One of these situations is where audible operation of a wireless mobile phone is prohibited or inappropriate. In addition to theaters, many restaurants have joined the rank of commercial establishments requesting their patrons to turn off their wireless mobile phones to enhance the enjoyment of other patrons. In circumstances like these, under the prior art, a user would have to either turn off the wireless mobile phone, or go into a "silent" mode to be notified of an incoming call. For the former option, the user will no longer be able to receive an incoming call, and is communicatively disconnected from the user's colleagues and friends. As to the latter option, generally, it means placing the wireless mobile phone in a vibrational mode of operation. Under this mode, a wireless mobile phone appropriately equipped with the proper vibrational features would notify a user of an incoming call through activation of a vibration unit included with the wireless mobile phone. However, once notified, generally there is no convenient way for the user to take and engage in the call. If the user desires to take the call, generally the user has to leave the environment that "imposed" the requirement.

Another situation is in the area of content presentation. While as alluded to earlier, many high end models provide for Internet access, generally, for bandwidth and other reasons, the world wide web (WWW) contents are edited, with substantial amount of the multi-media contents removed. As a result, user experiences are generally less satisfying when compared to e.g. accessing the WWW using a personal computer.

As those skilled in the art of wireless mobile telephony would appreciate, these are but a couple of examples of the limitations of the current generation of wireless mobile phones. One of the primary sensory abilities of a human being is the sensory of vision. Thus, as wireless mobile phones are increasingly becoming a personal accessory, it is desirable in general for wireless mobile phones to have greater abilities to visually present information or visually complement other conventional non-visual features.

BRIEF DESCRIPTION OF DRAWINGS

The present invention is illustrated by way of example and not by way of limitation in the figures of the accompanying drawings, in which like references indicate similar elements and in which:

FIGS. 2a & 2b illustrate the relevant operational flows of the visualizer, including the relevant operational flows of the visualization controller and an exemplary visualization agent, in accordance with one embodiment each, respectively;

FIGS. 3a & 3b illustrate an external view of a wireless mobile phone, incorporated with the visualization teachings of the present invention, in accordance with one embodiment;

FIGS. 8a & 8b illustrate exemplary visualizations of text and key stroking events, in accordance with one embodiment of the present invention.

DETAILED DESCRIPTION OF EMBODIMENTS OF THE PRESENT INVENTION

Embodiments of the present invention provides for visualization of various non-visual aspects of wireless mobile telephony to further enhance the usability of wireless mobile phones. Among the various visualizations contemplated are visualization of telephony events, alphanumeric contents of messages and web pages, and sound. Visualization of telephony events includes visualization of incoming call notifications and key stroking patterns (e.g. for menu selection). However, from the description to follow, it will be apparent that the visualization teachings of the present invention may also be applied and practiced with other non-visual aspects of wireless mobile telephony.

Further, in the description to follow, for purposes of explanation, various details are set forth in order to facilitate a thorough understanding of the present invention. However, the present invention may be practiced without some or many of the specific details. In other instances, in order not to obscure the illustrated embodiments of the present invention, well-known features are omitted, simplified or merely briefly described.

The description will be presented using terms that are commonly employed by those skilled in the art of wireless mobile telephony to convey the substance of their work to others skilled in the same art. Examples of these terms include but are not limited to incoming calls, detecting, determining, requesting, and so forth. As those skilled in the art of wireless mobile telephony would appreciate, these quantities may take the form of electrical, magnetic, or optical signals, and the operations involve corresponding processing of these signals by electrical, magnetic, or optical components.

The term "wireless mobile phone" as used herein (in the specification and in the claims) refers to the class of telephone devices equipped to enable a user to make and receive calls wirelessly, notwithstanding the user's movement, as long as the user is within the communication reach of a "service or base station" of a wireless network service provider. Unless specifically excluded, the term "wireless mobile phone" is to include the analog subclass as well as the digital subclass (of all signaling protocols).

Various operations will be described as multiple discrete steps in turn, in a manner that is most helpful in understanding the present invention. However, the order of description should not be construed as to imply that these operations are necessarily order dependent. In particular, these operations need not be performed in the order of presentation.

The phrase "in one embodiment" will be repeatedly employed in the description to follow. In general, the phrase does not refer to the same embodiment, although in some instances it may.

Figure 1:
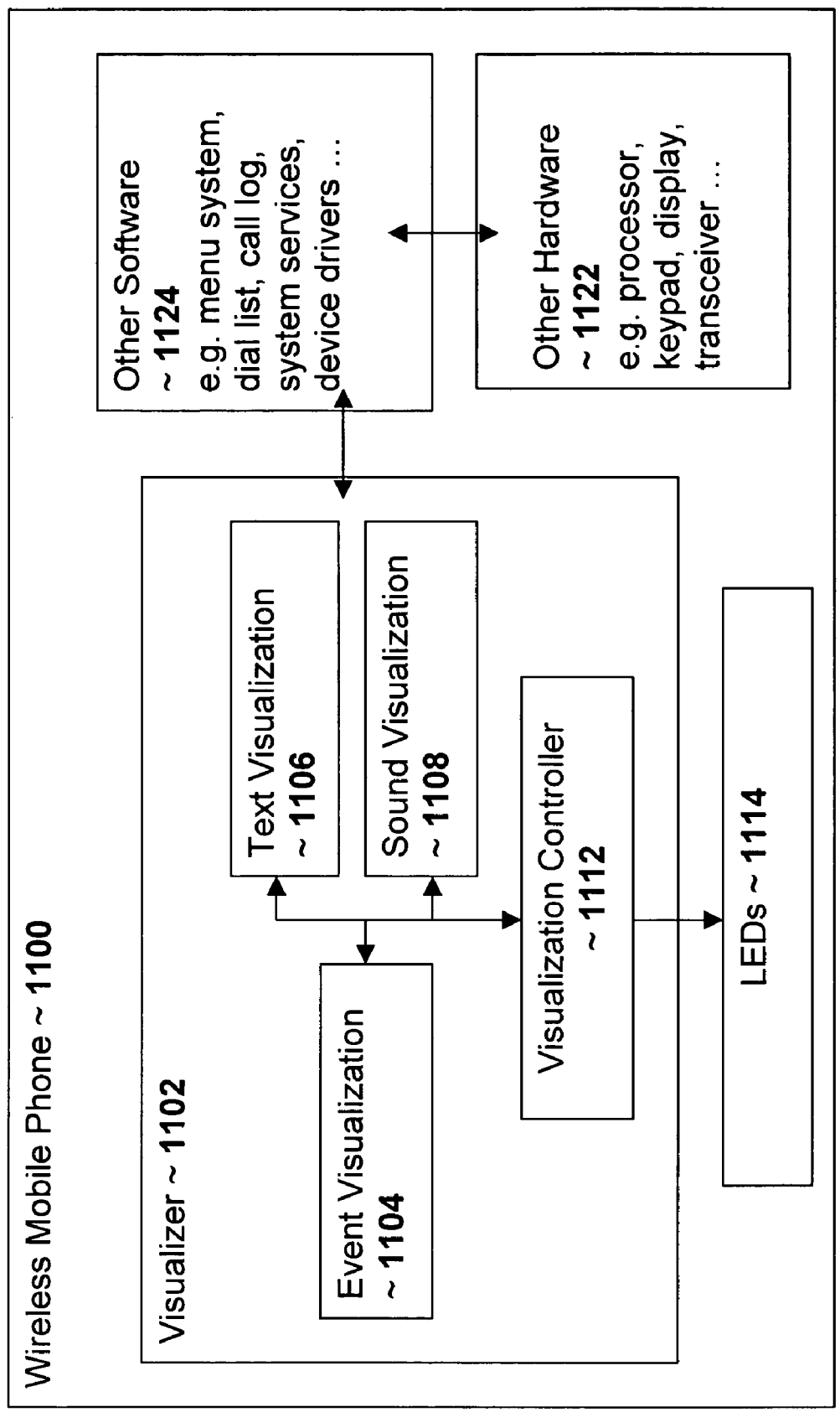
FIG. 1 illustrates a functional view of the visualization feature of present invention for wireless mobile phones, in accordance with one embodiment.

Referring now to FIG. 1, wherein a block diagram illustrating a functional view of the present invention, in accordance with one embodiment, is shown. As illustrated, in accordance with the present invention, wireless mobile phone 1100 is provided with a number of light emitting diodes (LEDs) 1114 and visualizer 1102. Further, visualizer 1102 includes in particular visualizer controller 1112. For the illustrated embodiment, visualizer 1102 also includes a number of visualization agents 1104–1108. More specifically, visualization agents 1104–1108 include event visualization agent 1104, text visualization 1106, and sound visualization agent 1108.

LEDs 1114 are employed by visualizer 1102 to effectuate visualization of various non-visual aspects of wireless mobile telephony to enhance a user's experience in using wireless mobile phone 1100. More specifically, the desired visualizations are effectuated by visualization controller 1112 selectively activating and de-activating selected ones of LEDs 1114 in selected manners, as requested by the requestors it serves. For the illustrated embodiments, these requesters include visualization agents 1104–1108.

Beside LEDs 1114 and visualizer 1102, for the illustrated embodiment, wireless mobile phone 1100 also includes other hardware and software components 1122–1124. Other hardware components 1122 include in particular a microprocessor for processing instructions, an input keypad for entering data and commands, a visual display for displaying information for the user, and a transceiver for sending and receiving signals wirelessly. Other software components 1124 include in particular corresponding device drivers (e.g. for controlling the input keypad and the visual display), system services (e.g. graphics and audio services), a browser (e.g. for accessing the WWW), and various applications (e.g. dial list, call log, and so forth). Typically, at least selected ones of these system services, the browser and/or the applications include menus of commands for user selection.

For the illustrated embodiment, other hardware and software components 1122–1124 of wireless mobile phone 1100 include in particular the facilities necessary to practice the conduct of a non-audible call, using Morse codes. Conducting non-audible calls, in particular, through employment of Morse code, is the subject of incorporated by reference application '587. The required facilities are described in detail therein. Readers are directed to application '587 for details.

For the illustrated embodiment, these other hardware and software components 1122–1124 of wireless mobile phone 1100 also include in particular the facilities necessary to practice the selection of menu items by stroking or gliding over the input keys of the input keypad in various predetermined stroking or gliding patterns. Data entry and/or menu item selection by way of key stroking or gliding patterns is the subject of incorporated by reference application '197. The required facilities are described in detail therein. Readers are likewise directed to application '197 for details.

Figure 4B:
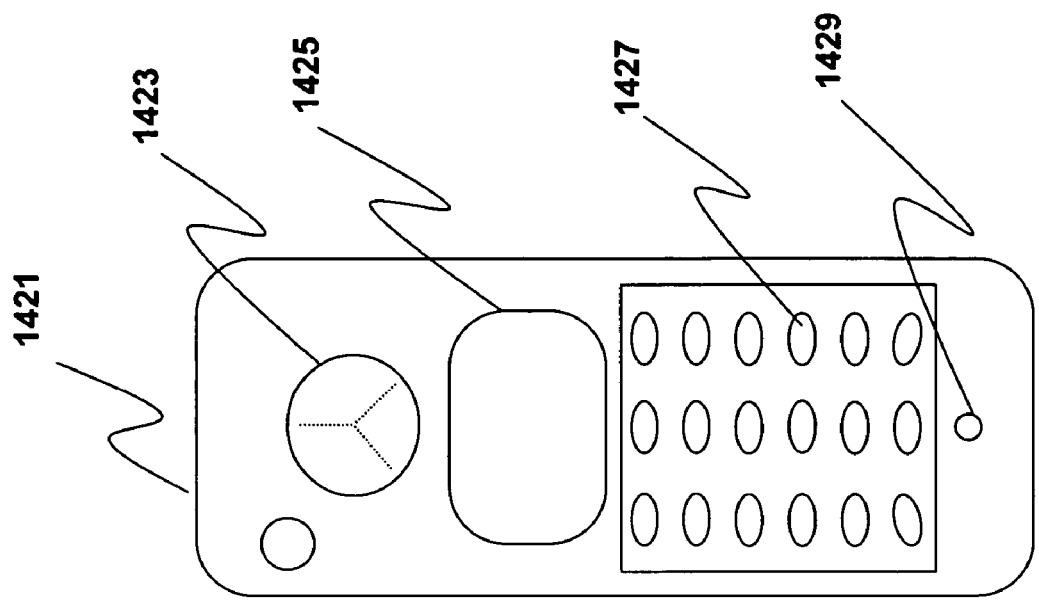
FIGS. 4a & 4b illustrate an exposed view of a wireless mobile phone, incorporated with the visualization teachings of the present invention, in accordance with another embodiment.
Figure 4A:
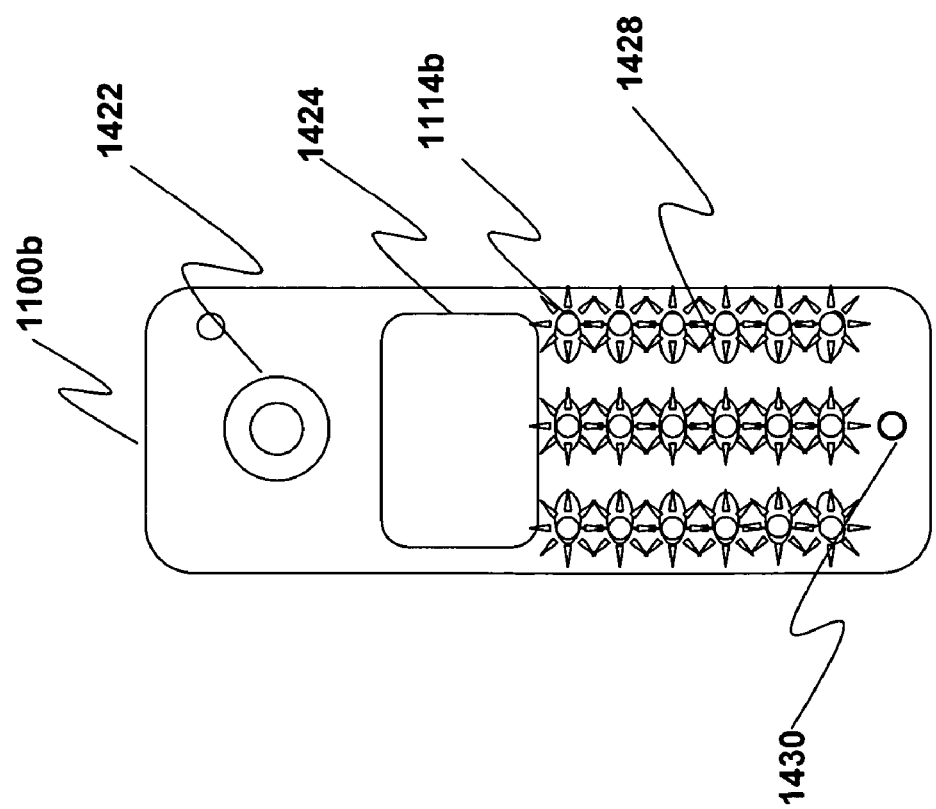

Continuing to refer to FIG. 1, the number of LEDs 1114 to be employed as well as the manner in which they may be arranged are embodiment or configuration dependent. In one embodiment, a single column of LEDs 1114 disposed on a side surface of wireless mobile phone 1100 (as illustrated by FIG. 3a) is employed. In another embodiment, a collection of LEDs 1114 "integrally" arranged around or under the input keys of wireless mobile phone 1100 (as illustrated by FIG. 4a) is employed. In general, more variations, patterns and manners of visualization may be effectuated if more LEDs 1114 are employed. However, for each embodiment or configuration, the number of LEDs 1114 employable is constrained by cost, as well as by the spatial limitations imposed by the physical dimension and the number of other features included with the particular embodiment/configuration of wireless mobile phone 1100.

LEDs 1114 are presently preferred for their relatively low power consumption and compactness in size. Together, these attributes allow a higher number of individually illuminable light sources to be employed. In turn, the higher number of illuminable sources allows more variations in the manner the illuminable light sources may be arranged and disposed. However, in alternate embodiments, other light sourcing elements having attributes consistent with the design objectives and constraints may also be employed for the practice of the present invention. Accordingly, the term "LEDs" as used herein and in the claims are to be broadly construed, and given its conventional meaning as well as an expansive meaning including light sourcing elements with like attributes.

As described earlier, visualization controller 1112 is employed to perform the earlier described selective activation and deactivation of selected ones of LEDs 1114 in selected manners. The performances are made responsive to the requests of various visualization agents 1104–1108. For the illustrated embodiment, each of the various visualization agents 1104–1108 is responsible for invoking visualization controller 1112 to direct the activations and deactivations of LEDs 1114 to achieve the desired visualization for a corresponding non-visual aspect of wireless mobile telephony.

More specifically, event visualization agent 1102 is responsible for invoking visualization controller 1112 to direct LEDs 1114 to effectuate visualization of various telephony events associated with wireless mobile telephony. For the illustrated embodiment, these telephony events include in particular the arrival of an incoming call, as well as the key stroking pattern for selecting a menu item (see FIG. 8b, ref. 1804).

Figure 7A:
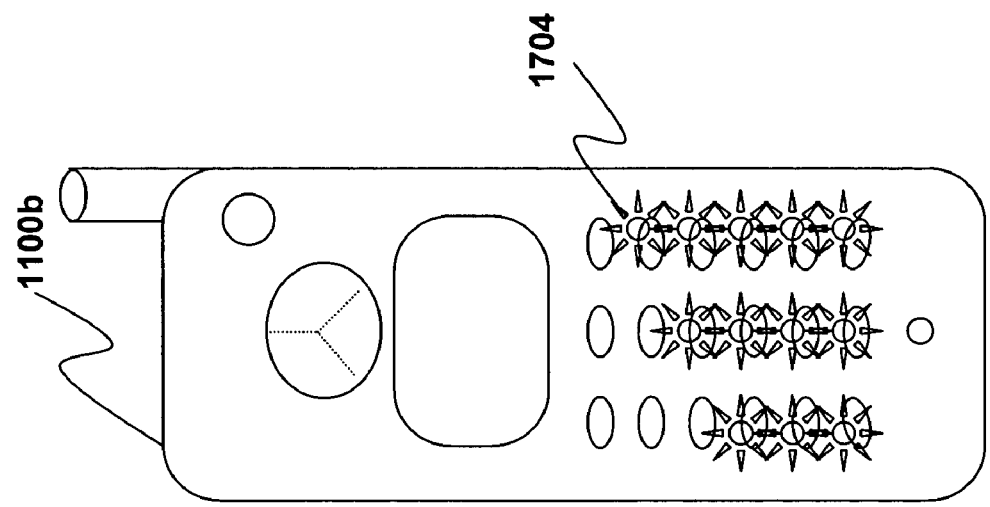
FIGS. 7a & 7b illustrate exemplary visualizations of graphics and sounds, in accordance with one embodiment of the present invention.
Figure 7B:
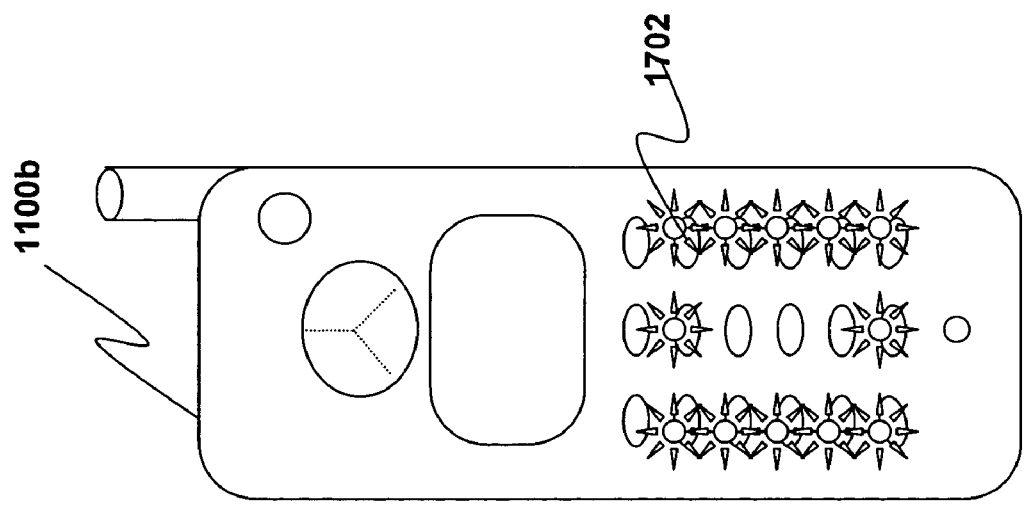

Similarly, text visualization agent 1106 is responsible for invoking visualization controller 1112 to direct LEDs 1114 to effectuate visualization of various textual contents associated with wireless mobile telephony. For the illustrated embodiment, the textual contents include in particular textual contents of messages associated with a non-audible call, conducted using Morse code (see e.g. FIG. 8a, ref. 1802), as well as textual contents of web pages (see e.g. FIG. 7a, ref. 1702). In other words, the present invention may be employed to enhance the user experience associated with operating in a "silent" mode, learning to use Morse code to conduct a non-audible call, or viewing multi-media content reduced web pages. Sound visualization agent 1108 is responsible for invoking visualization controller 1112 to direct LEDs 1114 to effectuate visualization of sounds associated with wireless mobile telephony and auxiliary functions (see e.g. FIG. 7b, ref. 1704).

In various embodiments, the various sounds may include audio output of an included radio or an included MPx player or streaming audio (where MPx is one of the Moving Picture Expert Group audio standards, such as MP3, MP4 and so forth). In other words, the present invention may be employed to enhance the user experience associated with enjoying locally rendered or streamed audio.

In other embodiments, the various sounds may include audio input picked up from the microphone. The audio may be "meaningful" ambient sounds. Examples of "meaningful" ambient sounds include but are not limited to music picked up from the ambient while the user of the wireless mobile phone is attending a concert with the phone, or crowd noise picked up from the ambient while the user of the wireless mobile phone is present in a sporting event with the phone.

Concert may be concert of any music type, country western, rock 'n roll, pop, rap, jazz, classical, and so forth. Sporting event may be sporting event of any type, baseball, basketball, football, soccer, volleyball, swim meet, track, and so forth.

In various embodiments, the LEDs may be lit deterministically or pseudo randomly with at least one of the number of LEDs employed, the locations of LED employed, the color of the LEDs employed, and the intensity of the LEDs employed having a functional relationship to at least one attribute of the audio.

Attributes of the audio include but are not limited to volume, frequency band/spectrum, treble, bass, presence of certain instruments, presence of certain notes, and so forth.

In various embodiments, LEDs or groups of LEDs are correspondingly disposed underneath the input keys of the input keypad. Preferably, multiple color LEDs and/or multi-color LEDs are employed.

For selected ones of these embodiments, a graphic equalizer is animated using the correspondingly disposed LEDs. In some embodiments, the different spectrums are animated on different columns of the LEDs, with the number of LEDs lit in each column corresponding to the volume of the audio in the corresponding spectrum, while in others, the different spectrums are animated on different rows of the LEDs, with the number of LEDs lit in each row corresponding to the volume of the audio in the corresponding spectrum.

Further, in various embodiments, different colors are employed for different volume levels. For example, in a columnar embodiment, the color white is employed for the LEDs disposed with the first two rows of keys, the color yellow is employed for the LEDs disposed with the second two rows of keys, and the color red is employed for the LEDs disposed with the third two rows of keys. Of course, in alternate embodiments, the present invention may be practiced with different colors, and different row grouping of LEDs.

In other embodiments, in lieu of a graphic analyzer, a geometric primitive, a pattern, a thing, an object, a person or an animal may be animated instead. For example, a pattern or a geometric primitive, such as a spiral, a helix, or a vortex may be animated in accordance with one or more attributes of the audio. As a further example, an instrument, such as a guitar, a trumpet, a saxophone, a guitar, a drum, a pair of drumstick may be animated based on the presence of the instrument and/or attribute(s) of the audio (associated with the instrument). A ball, such as a baseball, a football, a basketball, a soccer ball, and a volleyball may be animated based on the volume of the ambient audio. Similarly, a mascot, such as a ram, a dolphin, a bronco, a lion, a tiger, a buffalo, a colt, a sea hawk, or a person, such as a pirate, a patriot, may also be animated based on the volume of the ambient noise. In yet other embodiments, the LEDs may be lit to animate "dance steps" based on selected attributes of the audio (music). Resultantly, a user of the wireless mobile phone may finger dance to the music, by tapping on the corresponding keys, following the animation.

For the illustrated embodiment, visualizer controller 1112 advantageously offers at least two manners, a visualization agent may request a visualization operation or visualization operations to be performed. These two manners include a first manner where a singular round of activation and deactivation of LEDs 1114 may be requested, and a second manner where a number of rounds of activation and deactivation of LEDs 1114 may be simultaneously requested via a single request.

In one embodiment, the first manner is requested via a function call to visualization controller 1112, providing controller 1112 with the identifiers of LEDs 1114 to be activated, and the corresponding durations of activation. For this embodiment, all other unspecified LEDs 1114 are assumed to remain deactivated. In alternate embodiments, group specifications in particular, an "ALL" LED group may be advantageously supported. Additionally, in various embodiments, the intensity or brightest of each LED may be specified (e.g. by way of an intensity/brightness index in the range of 0 through 16). Further, for multi-colored LEDs, the color may be specified.

In one embodiment, the second manner is requested via a function call to visualization controller 1112, providing controller 1112 with a pointer to a starting location in the included memory of wireless mobile phone 1100, where a data structure containing a series of rounds or cycles of activation and deactivation specifications is stored. The function call, in addition to the pointer, also includes a size of the data structure. In alternate embodiments, a predetermined end of structure demarcation may be employed, in lieu of a size specification. For each round/cycle of activation and deactivation, the LEDs to be turned on and off are identified. For example, for a row of eight LEDs, the LEDs to be turned on and off for a round or cycle may be specified by the "vector" [01010111] with "0" denoting an "off" state and "1" denoting an "on" state. In alternate embodiments, other manners of specification as well as other manners of providing the specification may be employed instead. Further, as before, the intensity/brightness as well as color (in the case of multi-color LEDs) may be specified.

The above described approaches are just two exemplary approaches where a visualization agent may request visualization controller 1112 to selectively activate and deactivate LEDs 1114 on its behalf. Further, agents 1104–1108 are provided in the illustrated embodiment to facilitate the effectuation of the desired visualizations, such that the desired visualizations may be achieved without requiring or merely requiring relatively small amount of modifications to the main line logic or operational components of wireless mobile phone 1100. However, in embodiments where the earlier described "request" interface of visualization controller 1112 is practiced, the visualization services offered by visualization controller 1112 may also be directly invoked by the other components of wireless mobile phone 1100 instead, should direct incorporation of the required logic into these other components of wireless mobile phone 1100 to practice the present invention be desirable. Thus, generically, a visualization requester, whether it is an "intervening" agent like visualization agents 1104–1108 or a functional "principal" (such as the component responsible for incoming call notification), may be referred to as a visualization "client".

Referring now to FIGS. 2a–2b, wherein the relevant operational flows of visualization controller 1112 and agents 1104–1108 for practicing the present invention, in accordance with two embodiments, are shown, respectively. As illustrated in FIG. 2a, upon receipt of a request to selectively activate or deactivate selected ones of LEDs 1114 in selected manners, block 1202, visualization controller 1112 determines if the request is of the first type (i.e. a single round request type), or of the second type (i.e. the multiple rounds/cycles request type), block 1204. The distinction of the two types may be explicitly specified or implicitly inferred based at least in part on the format and/or substance of the calling parameters included with the function call.

If the request is determined to be of the first type (i.e. a single round request type), visualization controller 1112 activates and/or deactivates selected ones of LEDs 1114 as requested, block 1208. If the request is determined to be of the second type (i.e. a multiple round/cycle request type), visualization controller 1112 activates and/or deactivates selected ones of LEDs 1114 as requested, block 1208, after retrieving the "specification" for the activations/deactivations to be performed, block 1206. For a multiple round request, the activation/deactivation operation of LEDs 1114 of block 1208 is iteratively performed for a sufficient number of times to achieve the selective activation/deactivation requested.

FIG. 2b illustrates the relevant operational flow of an exemplary visualization agent, which may be event, text or sound visualization agent 1104, 1106, or 1108, in accordance with one embodiment. As illustrated, at initialization, the agent performs one of a number of possible actions to ensure it is availed with the relevant information and/or data associated with the non-visual aspect of wireless mobile telephony it is responsible for. These possible actions include but are not limited to registering itself with an appropriate source or system service, such that it will be notified of or provided with the relevant information and/or data, or performing the necessary set up or re-direct such that it will be availed the relevant information and/or data.

For example, in an embodiment where the practiced visualizations include visualizing notice of an incoming call, at initialization, event visualization agent 1104 may register itself with a component of wireless mobile phone 1100 responsible for detecting an incoming call to notify it of such detection. Alternatively, event visualization 1104 may set itself up such that it can detect any attempt by the component to generate one or more rings for the incoming call. As those skilled in the art would appreciate, visualized notice of an incoming call is a particular useful alternative to the vibrational approach for a non-audible mode of operation, in lieu of the audible rings. Note that even for the non-audible mode of operation, the re-direct approach may nevertheless be effective if the component responsible for generating the audible rings will nevertheless make the attempts to generate the audible rings, and the attempts are merely "suppressed" (i.e. failed) or re-channeled to the component responsible for the vibrational notification, in view of the non-audible mode of operation.

Another example is for text visualization agent 1106 to register itself with or monitor the activities of the component responsible for rendering textual messages received in a non-audible call or the component responsible for rendering substantially textual (i.e. multi-media reduced) web pages.

Yet another example is for sounds visualization agent 1108 to register itself with or monitor the activities of the component (e.g. a microphone, a browser, a radio, a MPx or other media player of phone 1100) responsible for rendering audio contents or streaming audio. In one embodiment, the underlying system services include services for digitizing and providing digitized samples of audio. Upon registration with the service, sounds visualization agent 1108 receives the audio samples, and in response, determines the relevant attributes, such as volume, spectrum, and so forth, accordingly. The number of attributes analyzed and/or characterized is application dependent. Characterization of audio by attributes, such as volume, spectrum, treble, bass, and so forth, is known, and accordingly, will not be further described.

Continuing to refer to FIG. 2b, upon ensuring that it will be availed of the relevant information and/or data, the exemplary visualization agent awaits for provision or detection of the relevant information and/or data, block 1224. Thereafter, upon receipt of or detection of the relevant information and/or data, the exemplary visualization agent determines if the visualization condition or conditions for the non-visual aspect of wireless mobile telephony it is responsible for are present, block 1224.

For example, in the case of event visualization agent 1104, it may consider the visualization condition is met upon having been notified by the component responsible for generating audible rings for incoming calls of the fact that an incoming call has been detected. In the case of text visualization agent 1106, it may consider the visualization condition being met upon detecting a textual message of a non-audio call being rendered, or upon detecting the browser rendering non-graphics or substantially textual contents. In the case of sounds visualization agent 1108, it may consider the visualization condition as being met, upon detecting a radio, a MPx or other media player rendering sounds, or a microphone picking up "meaningful" ambient sounds. Placing the wireless mobile phone in an operation state within which ambient sounds are considered meaningful, may be assisted by the user, e.g. via user prompt/confirmation.

Upon determining that one or more visualization conditions are met, the exemplary visualization agent determines the appropriate visualization for the detected condition or conditions, block 1226. In various embodiments, the visualization to be effectuated under various visualization conditions are predetermined, and their exact nature are application dependent.

For example, in the case of event visualization agent 1104, the predetermined visualization may involve requesting visualization controller 1112 to selectively activate and deactivate a row or column of LEDs 1114 to alert the user of an incoming call, or activate selected ones of LEDs 1114 to visualize the key stroking pattern corresponding to a menu selection made. This latter visualization is especially useful in teaching or familiarizing a user in selecting menu options through key stroking pattern (see co-pending '197 application for further detail on menu selection through key stroking pattern). In the case of textual visualization agent 1104, the predetermined visualization may involve requesting visualization controller 1112 to selectively activate and deactivate selected ones of LEDs 1114 to echo the corresponding Morse code representations of the alphanumeric characters of a textual message being rendered for a non-audible call, or selectively activate and deactivate selected ones of LEDs 1114 to render certain predetermined graphics of interest to supplement the non-graphics contents of a web page being rendered. The former visualization is also particularly useful in teaching or familiarizing a user to conduct a non-audible call using Morse code (see co-pending '587 application for further detail on conducting a non-audible call using Morse code). The predetermined graphics for the latter visualization may be completely arbitrary or dependent on the presence of certain key words in the non-graphics contents. In the case of sounds visualization agent 1108, the predetermined visualization may involve requesting visualization controller 1112 to selectively activate and deactivate selected ones of LEDs 1114 to render certain illumination patterns corresponding to certain predetermined attributes of the sound being rendered (e.g. its beat, tempo and so forth). The illumination to be rendered corresponding to the various attributes may be specified or stored in e.g. one or more audio visualization files. These specification files may be pre-provided, dynamically downloaded from a server, or retrieved from a storage medium integrated with an interchangeable covering of the mobile phone (also referred as "active" skin for certain embodiments, see the above identified co-pending application '098 for further detail). The various attributes may be determined e.g. from samples derived from the audio stream of the integrated radio or MPx player. The sampling may be performed continuously. In other words, for such continuous sampling embodiment, attributes are determined periodically based on the obtained samples, and the illumination pattern is selected based on the determined attributes. This process of attribute determination and illumination pattern selection is repeatedly performed, e.g. for as long as sounds are being rendered (or until instructed by a user to terminate).

Upon determining the visualization, the exemplary visualization agent requests visualization controller 1112 to effectuate the desired visualization accordingly, block 1228. Thereafter, the exemplary visualization agent returns to block 1224, and continues from there as described earlier, until eventually operation of the exemplary visualization agent is terminated (for whatever reason, e.g. when phone 1100 shuts down).

Note that while the foregoing description suggests that event, text and sound visualization agents 1104–1108 may operate with substantially the same operational flow, in alternate embodiments, each or selected ones of visualization agents 1104–1108 may operate with substantially different operational flow instead. Further, the present invention may be practiced with more or less visualization agents. Regardless of the number of visualization agents provided, preferably, user selection facility is provided to enable a user to selectively and individually enable or disable each of the provided visualization agents.

Having now described the present invention from a function view, in particular, the various relevant operational flows, we turn now to describe various exemplary embodiments for disposing and configuring the various elements for practicing the visualizations of the present invention. FIGS. 3a–3b illustrate an external view of a wireless mobile phone 1100a, incorporated with the visualization teachings of the present invention, in accordance with one embodiment. More specifically, FIG. 3a illustrates a side view of wireless mobile phone 1100a, whereas FIG. 3b illustrates a front view of wireless mobile phone 1100a.

For the illustrated embodiment, as alluded to earlier, wireless mobile phone 1100a includes antenna 1320, speaker 1322, visual display 1324, input key pad 1326 having input keys 1328, microphone 1330, and so forth. More importantly, wireless mobile phone 1100a includes LEDs 1114a disposed on a side exterior surface of the body of wireless mobile phone 1100a. In one implementation, wireless mobile phone 1100a further includes a radio (not shown). In another, wireless mobile phone 1100a further includes a MPx player (not shown).

In alternate embodiments, LEDs 1114a may be disposed in other exterior surfaces of the body of the wireless mobile phone 1100a instead. These other exterior surfaces may include the top or bottom exterior surface, and the front or back exterior surface. Note that by virtue of the manner content is displayed in visual display 1324, the exterior surfaces corresponding to the top, bottom, side, front and bottom surface are definitively defined.

For the illustrated embodiment, LEDs 1114a are disposed on the side exterior surface in a substantially columnar manner, along imaginary longitudinal axis 1311. In alternate embodiments, LEDs 1114a may be arranged in other configurations, e.g. in multiples of even or uneven rows and/or columns.

In one embodiment, LEDs 1114a are single ed LEDs of the same color. In another embodiment, LEDs 1114a are single colored LEDs of different colors. In yet another embodiment, every three single colored LEDs of different colors (e.g. one Red, one Green, and one Blue) are grouped and proximately disposed together (e.g. each input key having one corresponding group of LEDs around it), functionally forming multiple 3-LED groups to facilitate manifestation of other non-basic colors, such as orange, yellow and so forth. In yet another embodiment, at least some of LEDs 1114a are multi-colored LEDs. A multi-colored LED is a LED that is capable of emitting light in a selected one of a plurality of colors. FIGS. 4a–4b illustrate an exposed view of wireless mobile phone 1100b, in accordance with an alternate embodiment. More specifically, FIG. 4a illustrates an exposed front view of wireless mobile phone 1100b with its front cover 1421 removed, whereas FIG. 4b illustrates an exposed interior (or backside) view of front cover 1421. Front cover 1421 is also referred to as an interchangeable face plate.

Similar to the embodiments of FIGS. 3a–3b, wireless mobile phone 1100b includes speaker 1422, visual display 1424, input keys 1428, microphone 1430, and so forth. In one implementation, wireless mobile phone 1100b further includes a radio (not shown). Correspondingly, front cover (face plate) 1421 has "opening" 1423 for speaker 1422, "opening" 1425 for visual display 1424, "opening" 1427 for input keys 1428, "opening" 1429 for microphone 1430, and so forth.

More importantly, wireless mobile phone 1100b includes LEDs 1114b disposed on the interior front surface of wireless mobile phone 1100b, near or around input keys 1428. With front cover (face plate) 1421 in place, LEDs 1114b appear to be integrally disposed with input keys 1428. In other words, for the illustrated embodiment, LEDs 1114b are disposed and configured as an array of light sources. In one implementation, front cover (face plate) 1421 further includes an electronic component (not shown) having stored therein, programming instructions implementing a MPx player.

Similar to the variants of the embodiment of FIGS. 3a–3b, LEDs 1114b may be single colored LEDs of the same color, or single colored LEDs of different colors. Further, in some embodiments, every three different color single colored LED, such as one Red, one Green and one Blue, may be grouped and proximately disposed together (e.g. each input key having one corresponding group of LEDs around it) to form groups of LEDs as earlier described. In yet other embodiments, at least some of LEDs 1114b may be multi-colored LEDs (where a selected one of a plurality of colors may be lit).

As will be described in more detail below, front cover (face plate) 1421 may be an "active" front cover/face plate having an electronic component wherein all or portions of the visualization teachings of the present invention are implemented. In particular, in various embodiments, "active" front cover (face plate) 1421 is an "active" covering "skin" covering all or a portion of the body of wireless mobile phone 1100b. For these embodiments, instead of being disposed and configured on the interior front surface of wireless mobile phone 110b, LEDs 1114b may be disposed on the exterior surface of the "active" interchangeable front cover (face plate) or covering "skin" instead. Active front cover (face plate) or covering "skin" is the subject matter of incorporated by reference application 'zzz. The constituting elements of these active front cover (face plate) or covering "skin" are described in details therein. Readers are referred to application 'zzz for details.

Figure 5:
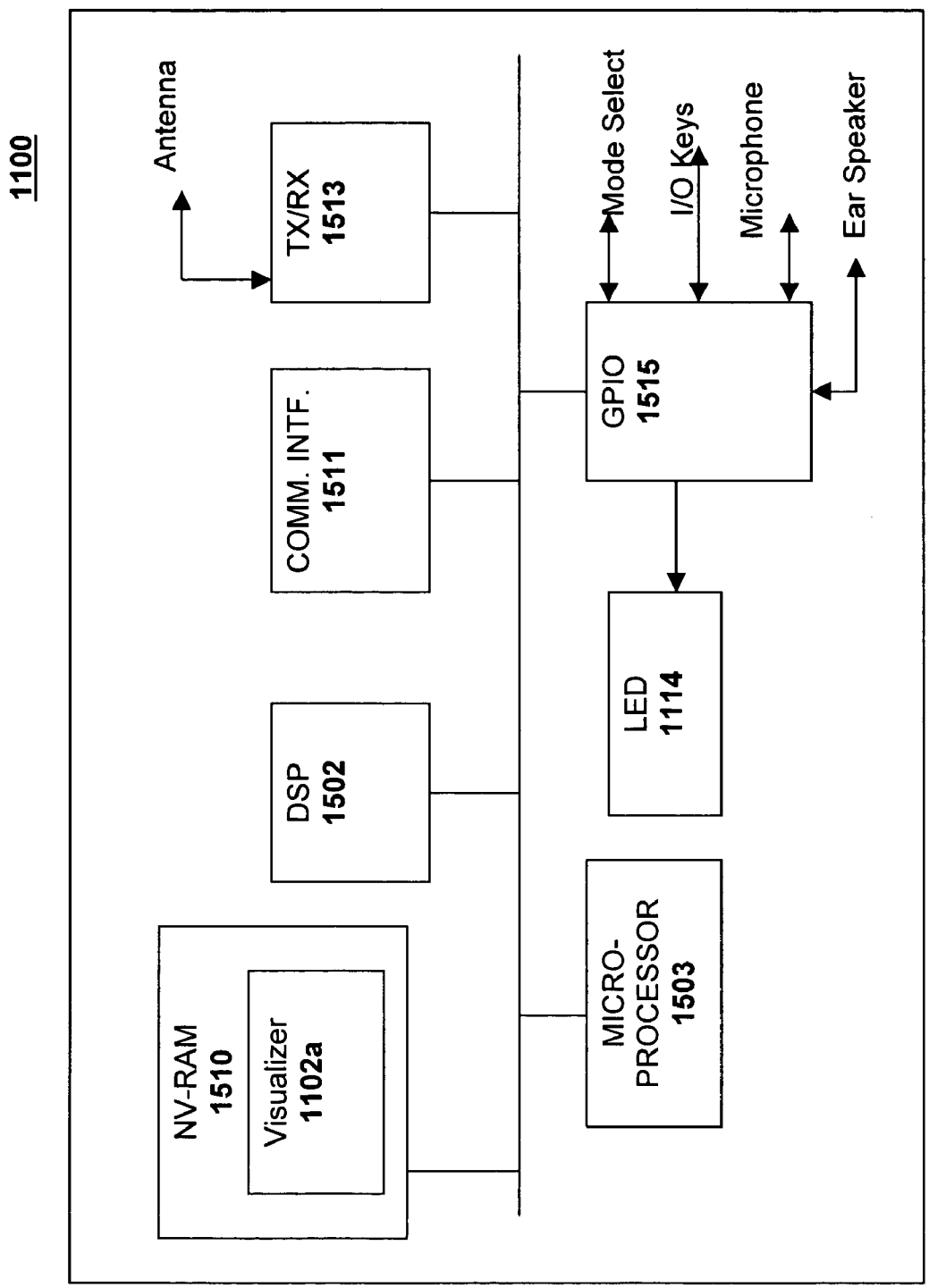
FIG. 5 illustrates an internal component view of a wireless mobile phone, incorporated with the visualization teachings of the present invention, in accordance with one embodiment.

FIG. 5 illustrates an internal component view of wireless mobile phone 1100, in accordance with one embodiment. As illustrated, wireless mobile phone 1100 includes the earlier mentioned microprocessor 1503, transmitter/receiver (TX/RX) 1513 (also known as transceiver), and so forth, coupled to each other as shown. Additionally, for the illustrated embodiment, wireless mobile phone 1100 further includes digital signal processor (DSP) 1502, communication interface 1511, and general-purpose input/output (GPIO) 1515, coupled to each other and to the earlier described elements as shown. Most importantly, wireless mobile phone 1100 includes LEDs 1114 and non-volatile memory 1510 having visualizer 1102a stored therein.

In addition to the conventional functions performed by these elements, the elements are employed to practice the visualization teachings of the present invention earlier described. In particular, among the conventional functions, it is expected that TX/RX 1513 may support one or more signaling protocols, including, but not limited to, code division multiple access (CDMA), time division multiple access (TDMA), global system for mobile communications (GSM), cellular digital packet data (CDPD), and so forth. Similarly, communication interface 1511 may support one or more serial, parallel and/or wireless communication protocols.

In alternate embodiments, other elements may be added, as well as having one or more of the illustrated elements omitted, without departing from the spirit and scope of the present invention.

Figure 6:
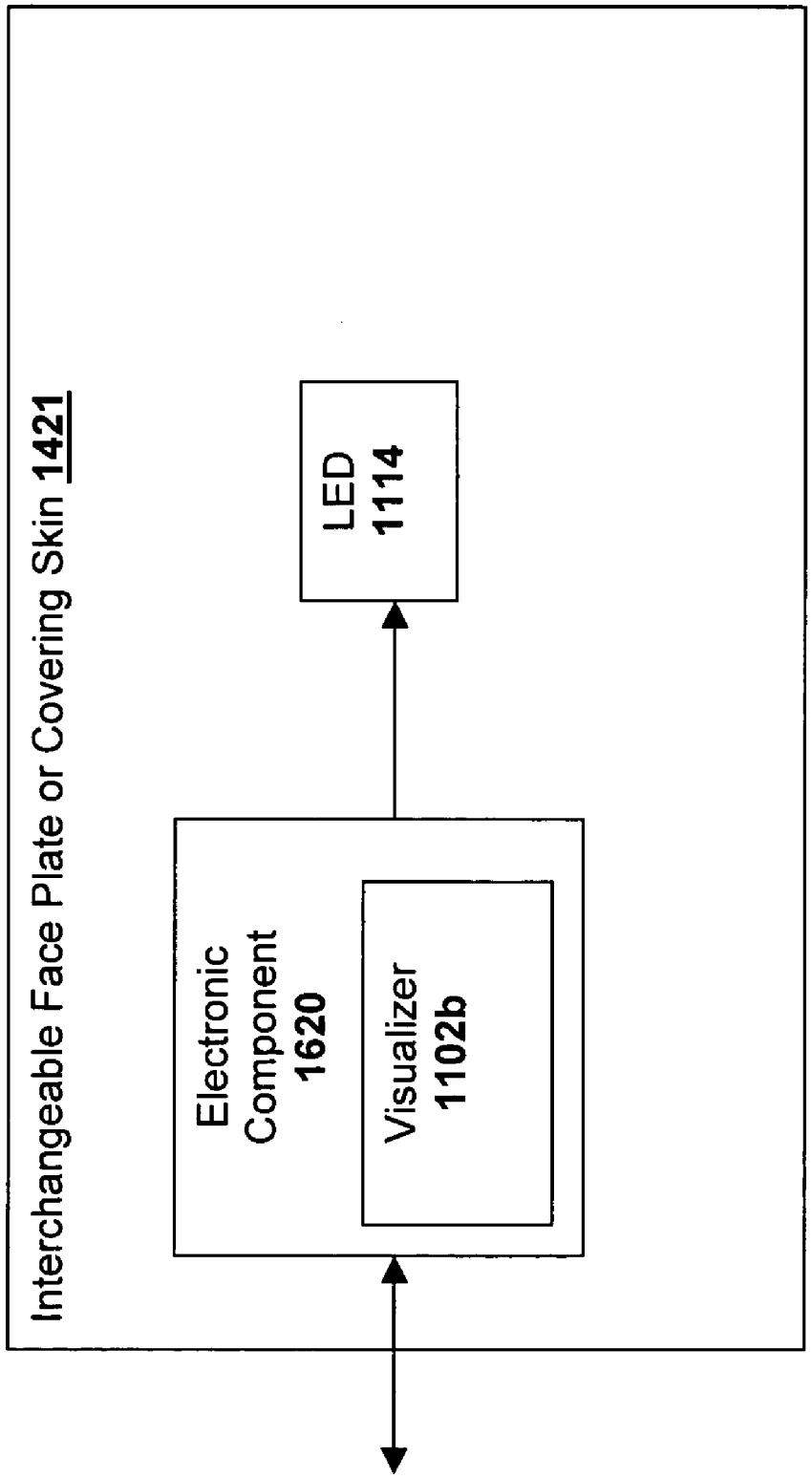
FIG. 6 illustrates an internal component view of an interchangeable portion of a wireless mobile phone, incorporated with the visualization teachings of the present invention, in accordance with one embodiment.

FIG. 6 illustrates an internal component view of an "active" version of interchangeable "cover" 1421, in accordance with one embodiment. As illustrated, "active" interchangeable "cover" 1421 includes in particular, electronic component 1620. For the illustrated embodiment, interchangeable "cover" 1421 also includes LEDs 1114 (disposed and configured on an exterior surface).

In various embodiments, interchangeable "cover" 1421 may be a "housing cover", i.e. being a part of a housing of the wireless mobile phone. In other embodiments, interchangeable "cover" 1421 may be an "accessory cover", i.e. the "cover" is merely "adorned by the wireless mobile phone, and does not form a part of a housing of the wireless mobile phone. Thus, term "cover", unless particularized, shall include "housing" as well as "accessory" covers.

In one embodiment, electronic component 1620 is a memory device, e.g. a subscriber identity module (SIM). In alternate embodiments, it may be a microprocessor having embedded memory. More importantly, for these embodiments, at least one or more of the visualization agents 1104–1108 are stored in the embedded memory. In various embodiments, the entire visualizer 1102, including visualization controller 1112, as well as agents 1104–1108 are stored in the embedded memory. In other words, for these embodiments, the visualization ability is additionally provided or partially provided to wireless mobile phone 1100 through the employment of an "active" interchangeable "cover" 1421 (i.e. face plate or covering skin), having embedded electronic component 1620 including all or a portion of visualizer 1102b.

Thus, it can be seen from the above description, methods and apparatuses for supplementing wireless mobile telephony with visualization of various non-visual aspects of wireless mobile telephony to improve usability have been described. As mentioned earlier, while the present invention has been described in terms of the above-illustrated embodiments, the present invention is not limited to the embodiments described. The present invention can be practiced with modification and alternation within the spirit and scope of the appended claims. For example, in various embodiments, visualization of events may include visualization of an "idle" state. That is, upon detection of an "idle" state, a predetermined pattern of activation and deactivation of the LEDs may be effectuated. The predetermined pattern may correspond to a theme, e.g. a Christmas theme, an American theme, and the like. The predetermined pattern may be pre-provided, downloaded or retrieved from the integrated electronic component of an interchangeable cover plate ("active" skin). Thus, the description is to be regarded as illustrative instead of restrictive on the present invention.

What is claimed is:

1. A wireless mobile phone comprising:
   a transceiver to receive and send audio communication;
   an audio renderer to render audio;
   a plurality of light emitting diodes (LEDs);
   a visualization controller coupled to the LEDs to selectively activate and deactivate the LEDs as requested; and
   a sound visualization client coupled to the visualization controller to request the visualization controller to selectively activate and deactivate the LEDs in at least one desired manner to effectuate visualization of audio rendered by the audio renderer, in accordance with at least one or more attributes of the audio being rendered.

2. The wireless mobile phone of claim 1, wherein the attributes comprise one or more of a volume attribute, a spectrum attribute, a treble attribute, and a bass attribute.

3. The wireless mobile phone of claim 1, wherein the sound visualization client is designed to receive said at least one or more attributes.

4. The wireless mobile phone of claim 1, wherein the sound visualization client is designed to analyze said audio being rendered to determine said at least one or more attributes.

5. The wireless mobile phone of claim 1, wherein said sound visualization client requests the visualization controller to selectively activate and deactivate different color ones of the LEDs in view of the at least one or more attributes of the audio being rendered.

6. The wireless mobile phone of claim 1, wherein said sound visualization client requests the visualization controller to selectively activate and deactivate the LEDs to animate a selected one of a graphic analyzer, a geometric primitive, a pattern, a thing, an object, a person and an animal, in view of the at least one or more attributes of the audio being rendered.

7. The wireless mobile phone of claim 1, wherein said sound visualization client requests the visualization controller to selectively activate and deactivate the LEDs to depict a plurality of dance steps, in view of the at least one or more attributes of the audio being rendered.

8. The wireless mobile phone of claim 1, wherein said wireless mobile phone further comprises a processor to execute programming instructions;
   said visualizer controller comprises first programming instructions designed to perform said selective activation and deactivation of selected ones of said LEDs as requested; and
   said sound visualization client comprises second programming instructions designed to perform said request of the visualization controller to effectuate said visualization of the audio being rendered by the audio renderer.

9. The wireless mobile phone of claim 8, wherein said first programming instructions of said visualization controller are designed to accept a request to activate/deactivate selected ones of said LEDs in at least one of a first form singularly specifying one round of activation and deactivation of said LEDs, and a second form simultaneously specifying a series of rounds of activations and deactivations of said LEDs.

10. The wireless mobile phone of claim 8, wherein said wireless mobile phone further comprises a first storage medium having stored therein at least said first programming instructions of said visualization controller.

11. The wireless mobile phone of claim 10, wherein said wireless mobile phone further comprises second storage medium having stored therein at least a portion of said second programming instructions of said audio visualization client.

12. The wireless mobile phone of claim 11, wherein
   said wireless mobile phone further comprises a body having one of at least two designs, a first design where a complementary cover of the body is substitutable with any one of a plurality of embodiments of said cover, and a second design where said body is at least partially coverable by a selected one of a plurality of embodiments of a complementary cover of the body; and
   each of said embodiments of said cover comprises an electronic component including at least said second storage medium.

13. The wireless mobile phone of claim 12, wherein said electronic component further comprises said first storage medium.

14. The wireless mobile phone of claim 13, wherein the first and second storage medium are the same storage medium.

15. The wireless mobile phone of claim 12, wherein each of said embodiments of said cover comprises a front facing exterior surface, and said LEDs being disposed on said front facing exterior surface.

16. The wireless mobile phone of claim 1, wherein said wireless mobile phone further comprises a body having an exterior surface, and said LEDs being disposed on said exterior surface.

17. The wireless mobile phone of claim 16, wherein said exterior surface is a selected one of a front exterior surface, a back exterior surface, a side exterior surface, a top exterior surface, and a bottom exterior surface of said body of said wireless mobile phone.

18. The wireless mobile phone of claim 1, wherein said wireless mobile phone further comprises a key pad having a plurality of keys, and said LEDs being integrally disposed with said keys.

19. The wireless mobile phone of claim 1, wherein said LEDs comprises single color LEDs of a plurality of colors, organized into groups.

20. The wireless mobile phone of claim 1, wherein said LEDs comprises at least one multi-color LED.

21. The wireless mobile phone of claim 1, wherein said audio renderer comprises a selected one of a radio and a MPx player.

22. The wireless mobile phone of claim 1, wherein the phone further comprises a microphone to provide said audio to said audio renderer to render.

23. A wireless mobile phone comprising:
means for sending and receiving audio communication;
means for rendering sound;
means for emitting light;
visualization control means coupled to the light emitting means to selectively activate and deactivate the light emitting means as requested; and
sound visualization client means coupled to the visualization control means to request the visualization control means to selectively activate and deactivate the light emitting means in a desired manner to effectuate visualization of the sound being rendered by the sound rendering means, in accordance with one or more attributes of the sound being rendered.

24. The wireless mobile phone of claim 23, wherein said sound visualization client means requests the visualization control means to selectively activate and deactivate different color ones of the light emitting means, in view of a volume attribute of the sound being rendered.

25. The wireless mobile phone of claim 23, wherein said sound visualization client means requests the visualization control means to selectively activate and deactivate the light emitting means to animate a selected one of a graphic analyzer, a geometric primitive, a pattern, a thing, an object, a person and an animal, in view of the at least one or more attributes of the sound being rendered.

26. The wireless mobile phone of claim 23, wherein said sound visualization client means requests the visualization control means to selectively activate and deactivate the light emitting means to depict a plurality of dance steps, in view of the at least one or more attributes of the sound being rendered.

27. The wireless mobile phone of claim 23, wherein the phone further comprises means to provide ambient sound to said sound rendering means.

28. An article of manufacture comprising
a cover designed to at least partially cover a body of a wireless mobile phone; and
an electronic component embedded in said cover, the electronic component including storage medium having stored therein at least first programming instructions implementing a sound visualization client that requests a visualization controller of the wireless mobile phone to selectively activate and deactivate a plurality of light emitting diodes (LEDs) of the wireless mobile phone to visualize audio being rendered by an audio renderer of the wireless mobile telephone.

29. The wireless mobile phone of claim 28, wherein said sound visualization client requests the visualization controller to selectively activate and deactivate different color ones of the LEDs, in view of a volume attribute of the sound being rendered.

30. The article of manufacture of claim 28, wherein said sound visualization client requests the visualization controller to selectively activate and deactivate the LEDs to animate a selected one of a graphic analyzer, a geometric primitive, a pattern, a thing, an object, a person and an animal, in view of the at least one or more attributes of the audio being rendered.

31. The article of manufacture of claim 28, wherein said sound visualization client requests the visualization controller to selectively activate and deactivate the LEDs to depict a plurality of dance steps, in view of the at least one or more attributes of the audio being rendered.

32. The article of claim 28, wherein the cover is a selected one of a housing cover and an accessory cover.

33. A method comprising:
monitoring audio being rendered out of a wireless mobile phone; and
selectively activating and deactivating a plurality of light emitting diodes (LEDs) of the wireless mobile phone to visualize the audio being rendered based at least in part on at least one or more attributes of the audio being rendered.

34. The method of claim 33, wherein said selective activating and deactivating comprises selectively activating and deactivating different color ones of the light emitting diodes in view of a volume attribute of the audio being rendered.

35. The method of claim 33, wherein said selective activating and deactivating comprises selectively activating and deactivating the light emitting diodes to animate a selected one of a graphic analyzer, a geometric primitive, a pattern, a thing, an object, a person and an animal, in view of the at least one or more attributes of the audio being rendered.

36. The method of claim 33, wherein said selective activating and deactivating comprises selectively activating and deactivating the light emitting diodes to selectively activate and deactivate the light emitting diodes to depict a plurality of dance steps, in view of the at least one or more attributes of the audio being rendered.

* * * * *